United States Patent [19]

Pakulski et al.

[11] Patent Number: 5,360,558
[45] Date of Patent: Nov. 1, 1994

[54] SLURRIED POLYMER FOAM SYSTEM AND METHOD FOR THE USE THEREOF

[75] Inventors: Marek Pakulski, The Woodlands; Barry T. Hlidek, Shenandoah, Tex.

[73] Assignee: The Western Company of North America, Houston, Tex.

[21] Appl. No.: 951,946

[22] Filed: Sep. 28, 1992

Related U.S. Application Data

[63] Continuation of Ser. No. 660,298, Feb. 22, 1991, abandoned.

[51] Int. Cl.$^5$ ............................................... E21B 43/26
[52] U.S. Cl. ................................... 252/8.551; 166/308
[58] Field of Search .................... 166/308; 252/8.551

[56] References Cited

U.S. PATENT DOCUMENTS

| | | |
|---|---|---|
| Re. 32,302 | 12/1986 | Almond et al. . |
| 3,195,634 | 7/1965 | Hill . |
| 3,310,112 | 3/1967 | Nielsen et al. . |
| 3,396,107 | 8/1968 | Hill . |
| 3,833,061 | 9/1974 | Gall et al. . |
| 3,898,165 | 8/1975 | Ely et al. . |
| 3,918,524 | 11/1975 | Broaddus et al. . |
| 3,937,283 | 2/1976 | Blauer et al. . |
| 3,948,325 | 4/1976 | Winston et al. . |
| 3,952,086 | 4/1976 | Fieldhouse . |
| 3,954,142 | 5/1976 | Broaddus et al. . |
| 3,981,363 | 9/1976 | Gall . |
| 4,039,029 | 8/1977 | Gall . |
| 4,201,678 | 5/1980 | Pye et al. ............... 252/8.551 X |
| 4,212,354 | 7/1980 | Guinn . |
| 4,233,166 | 11/1980 | Allen . |
| 4,239,629 | 12/1980 | Sauber . |
| 4,313,834 | 2/1982 | Harris . |
| 4,324,668 | 4/1982 | Harris . |
| 4,440,653 | 4/1984 | Briscoe et al. . |
| 4,453,596 | 6/1984 | Conway et al. ........... 166/308 X |
| 4,460,627 | 7/1984 | Weaver et al. . |
| 4,460,751 | 7/1984 | Hanlon et al. . |
| 4,463,810 | 8/1984 | Hill . |
| 4,477,360 | 10/1984 | Almond . |
| 4,480,696 | 11/1984 | Almond et al. . |
| 4,487,866 | 12/1984 | Almond et al. . |
| 4,487,867 | 12/1984 | Almond et al. . |
| 4,519,455 | 5/1985 | Holtmyer et al. . |
| 4,524,829 | 1/1985 | Hanlon et al. . |
| 4,532,052 | 7/1985 | Weaver et al. . |
| 4,541,935 | 9/1985 | Constien et al. . |
| 4,552,215 | 11/1985 | Almond et al. . |
| 4,553,601 | 11/1985 | Almond et al. . |
| 4,554,082 | 11/1985 | Holtmyer et al. . |
| 4,606,772 | 8/1986 | Almond et al. . |
| 4,627,495 | 12/1986 | Harris et al. . |
| 4,662,155 | 11/1986 | Harris et al. . |
| 4,796,702 | 1/1989 | Scherubel ................... 166/308 |
| 4,887,671 | 12/1989 | Stevens, Jr. ............... 166/308 |
| 4,911,241 | 3/1990 | Williamson et al. ........ 166/308 |

OTHER PUBLICATIONS

Flick, E. W. *Cosmetics and Toiletry Formulations.* New Jersey, Noyes Pubs., 1984. pp. 408–477. Ref. TP983 F5.

*Primary Examiner*—Gary Geist
*Attorney, Agent, or Firm*—Peter A. Bielinski

[57] ABSTRACT

This invention record describes a method for fracturing subterranean formations utilizing a foam comprising a water-based fracturing fluid comprised of water or brine or water and brine or brine and alcohol and a polymer slurry in diesel oil. Preferably, the polymer is comprised of a guar polymer and diesel oil in equal amounts. The foamer component preferably is comprised of cocobetaine, a solvent, an alpha-olefin sulfonate and water. The energizing phase component is comprised of carbon dioxide, nitrogen or a mixture of carbon dioxide and nitrogen.

34 Claims, 1 Drawing Sheet

SLURRIED POLYMER FOAM SYSTEM AND METHOD FOR THE USE THEREOF

This is a continuation of U.S. patent application Ser. No. 07/660,298 filed Feb. 22, 1991 now abandoned.

TECHNICAL FIELD OF THE INVENTION

The present invention provides a method for fracturing subterranean formations utilizing a foam comprised of a fracturing gel component containing a polymer and liquid hydrocarbon mixed with water, brine, or water and brine, a foamer component which is compatible with the fracturing gel component, and an energizing phase component.

BACKGROUND OF THE INVENTION

The use of fluids to treat subterranean formations penetrated by a well bore containing hydrocarbons to increase the permeability, conductivity and production from these formations is well known in the art. The process of treating the formations to increase conductivity through the use of these fluids is known as "fracturing" the formation. Generally, in a fracturing process, a fluid of sufficient viscosity is pumped and/or injected into the formation at sufficient pressure and rate to fracture the formation. The fracturing fluid is of sufficient viscosity to carry proppant into the formation and of sufficient viscosity to obtain fracturing of the formation at high pressure, shear and temperature. The proppant consists of such materials as sand, glass beads, sintered bauxite, fine gravel and the like. The proppant is carried into the fracture and helps keep the formed fractures open after fluid recovery. The newly formed fracture is held open by proppant which provides increased routes or channels through which hydrocarbons can flow increasing production. Various fracturing fluids and processes for their use are known in the art. The art discloses the use of slurries, emulsions and gels. More recently, it was discovered that foams could be used in place of the known slurries, emulsions and gels. See U.S. Pat. No. 3,937,283 to Blauer.

As described in Blauer, various gases and liquids can be used to compose the fracturing foam. Generally, the foams include nitrogen, carbon dioxide and water with a suitable surfactant. The foam, as with the slurries, gels and emulsions in the art, containing proppant is pumped into the formation at such a pressure that it causes the fracture of the formation. However, unlike the previous fracturing systems, the use of foams increases well clean up due to the fact that the foam is easily removed from the well because when the pressure is released or reduced, the foam expands. Various foam fracturing systems are known in the art.

Generally, in making a foam, a fracturing gel is first made from water or brine, a gelling agent, i.e., a polymer and a suitable surfactant. The water or brine may contain up to about 20% alcohol, for instance, methanol. In addition, the fracturing gel may be crosslinked by use of known crosslinkers. After the gel is made, a foamer is added and the gel with the roamer is added to an energizing phase such as carbon dioxide or nitrogen or a combination of carbon dioxide and nitrogen to create a foam. Various systems for the addition of the energizing phase to the gel phase have been described in the art. Indeed, various systems have been devised wherein the carbon dioxide is added as the gel is pumped down hole into the well bore and subsequently into the formation.

Various foamers are known in the prior art. For example, see U.S. Pat. Nos. 4,480,696, and RE 32,302. Betaines are known roamers. Betaines are multipurpose foaming agents or foamers primarily used in foam fracturing applications. Betaines are used to foam aqueous fluids while offering excellent detergency and interfacial tension-reducing properties. Betaines are particularly applicable to any reservoir which is generally classified as "water sensitive," that is, a reservoir which is slow to return water-based treatment fluids. Such reservoirs are often characterized by low permeability, and moderate amounts of clay or shale. Betaines offer superior performance in high temperature wells, where other foamers degrade.

Originally, fracturing foams were made utilizing a dry polymer which was mixed with water and the foamer before addition of the energizing phase. However, the use of a dry polymer, i.e., gelling agent was not conducive to fracturing systems wherein the water was gelled as it was pumped, that is, dry polymer was more limited to first mixing the polymer with water until a gel was formed and then pumping the gel for addition with the energizing phase and subsequent introduction into the formation. This method required more energy to be supplied by the surface pumps due to the increased viscosity of the gel. Further, if the fracturing job using the dry polymer system had to be abandoned or terminated permanently, the disposal of the pre-mixed gel created a problem.

In response to the above problems, a slurried polymer system was introduced into the market by The Western Company of North America. Western's slurried polymer system utilizes 50% diesel oil and 504 of a guar or guar-based polymer. The slurried polymer system of Western can include other liquid hydrocarbons besides diesel oil; for example, kerosene, naphtha, light mineral oil, and the like. Further, the fracturing gel made utilizing the slurried polymer system can be crosslinked. This system provides the advantage of being able to supply the gelling agent polymer in liquid form to the aqueous fluid as the aqueous fluid is pumped into the formation. If the fracturing Job has to be discontinued, then the supply of polymer is simply stopped, thus, the user does not have to face disposal problems of unused gel. Further, there is provided a system which increases in viscosity while being pumped, decreasing surface pump horsepower needed. However, it was discovered that the slurried polymer system was not compatible with fracturing gels utilizing an alkylbetaine, i.e., cocobetaine, as the foamer. It was specifically discovered that diesel oil and other liquid hydrocarbons used in the system are very efficient defoamers and made the use of the slurried polymer system with the betaine foamer undesirable due to the lack of stability of the foam produced.

Therefore, a need exists for a foamer which is compatible with the slurried polymer system utilizing a liquid hydrocarbon like diesel oil and demulsifiers as components. The present invention provides foamers which are compatible with a slurried polymer system and provides a foam which has the desired theological properties under high temperature, shear and pressure.

SUMMARY OF THE INVENTION

The present invention provides a foamer which is compatible with a fracturing gel comprising polymer slurried in diesel oil which is injected into brine to be used to fracture a subterranean formation. Preferably, the foamer is comprised of alkylbetaine, an alkali metal or ammonium alpha-olefin sulfonate, a hydrophilic solvent and water.

The present invention also provides a method for fracturing a subterranean formation utilizing a first fracturing gel component comprised of diesel oil and a polymer mixed with brine. The fracturing gel may be crosslinked if desired with crosslinkers known in the art. Simultaneously, while injecting the first fracturing gel component into a well bore adding a second foamer component comprised of solvent, betaine, an alpha-olefin sulfonate and water. After the addition of the first and second components and while injecting the first and second components into the well bore adding a third energizing phase component of carbon dioxide or nitrogen or a mixture of carbon dioxide and nitrogen. Further, after injecting the first, second and third components into the well bore, maintaining a pressure on the formation for a period of time sufficient to fracture the formation and subsequently releasing the pressure on the formation.

The present invention also provides a foam for fracturing subterranean formations comprised of a first fracturing gel component comprised of a polymer and diesel oil mixed with water, brine, or water and brine, a second foamer component comprised of a solvent, a betaine, an alpha-olefin sulfonate and water, and a third energizing phase component comprised of carbon dioxide or nitrogen or carbon dioxide and nitrogen.

The present invention further provides a foamer which is compatible with and to be used with fracturing gels containing diesel oil and demulsifiers which produces a 70% quality foam having a half life of at least one hour at 1,000 psi and 225° F.

The present invention further provides a fracturing foam composition comprised of (1) from about 0.2% to about 3% by volume slurry comprised of from about 50% to about 70% by volume polymer and from about 30% to about 50% by volume diesel oil, (2) from about 0.1% to about 2% by volume foamer component compatible with the slurry, (3) from about 10% to about 40% by volume water or brine or a mixture of water and brine or a mixture of brine and alcohol, and (4) from about 50% to about 90% by volume energizing phase component.

DETAILED DESCRIPTION OFT HE INVENTION

Figure 1:
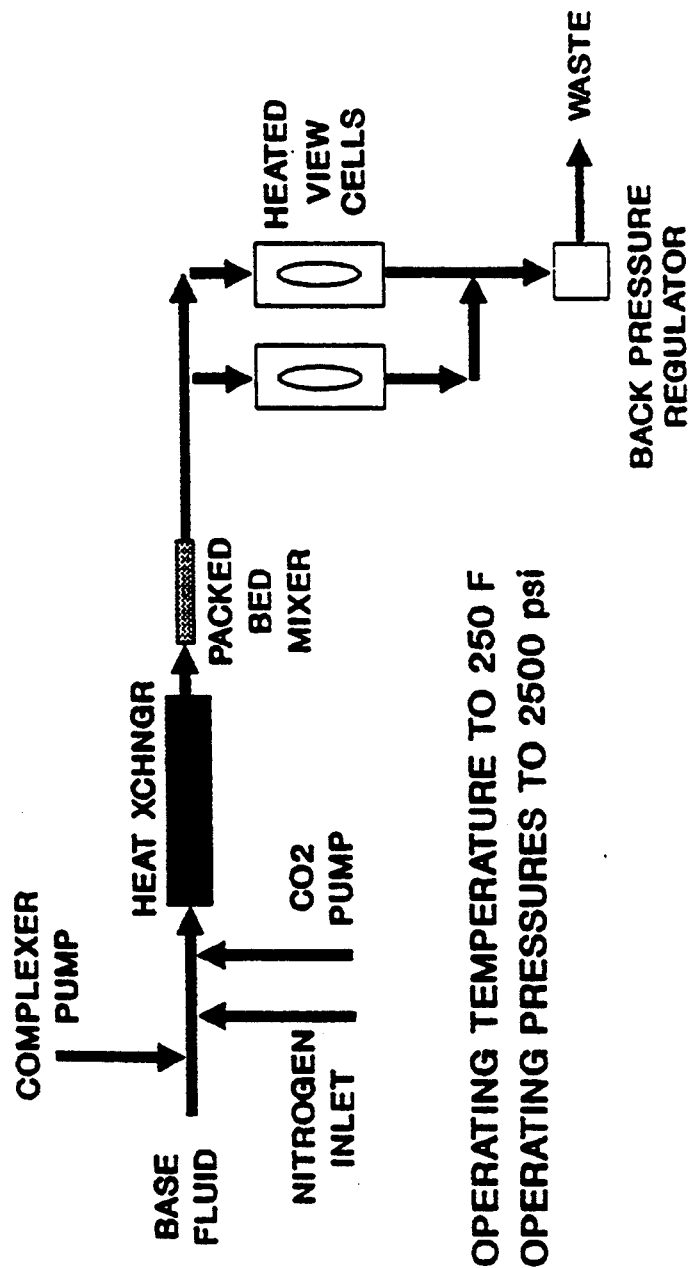
FIG. 1 is a diagram of the foam generation equipment used to test foamers of the present invention.

The fracturing foam composition of the present invention comprises a slurried polymer component, brine or water or brine and alcohol, a foamer component, and an energizing phase component.

The invention is directed to slurried polymer components comprised of a mixture of a liquid hydrocarbon and a polymer. For example, liquid hydrocarbons such as kerosene, naphtha, light mineral oil, diesel oil and the like and mixtures thereof are useful in the present invention. Preferably, the liquid hydrocarbon utilized is diesel oil. Preferably, the diesel oil and polymer are present in equal Mounts by weight percent of the slurried polymer component.

The polymer useful in the preparation of the slurried polymer component of the present invention includes solvatable polysaccharides having molecular weights of at least 100,000. Examples of polysaccharides useful in the present invention include the galactomannan gums, glucomannan gums, and their derivatives. Solvatable galactomannan and glucomannan gums are naturally occurring. The galactomannan gums and glucomannan gums can also be reacted with hydrophilic constituents to thereby produce derivatized polymers useful in the present invention. Solvatable polysaccharides having molecular weights of greater than about 200,000 are preferred in the practice of the present invention. The most preferred solvatable polysaccharides useful herein have molecular weights in the range of from about 200,000 to about 3 million. Examples of such polysaccharides include guar gum, locust bean gum, cara gum, xantham gum, and guar derivatives such as sodium carboxymethyl guar, hydroxyethyl guar, sodium carboxymethylhydroxyethyl guar, hydroxypropyl guar, sodium carboxymethylhydroxypropyl guar. Cellulose derivatives such as hydroxypropylcellulose, carboxymethylcellulose, and carboxymethylhydroxypropylcellulose are also useful in the present invention. The preferred polymers are guar gum, hydroxypropyl guar and sodium carboxymethylhydroxypropyl guar; the most preferred gelling agent is sodium carboxymethylhydroxypropyl guar.

The foamer component of the present invention shows excellent nitrogen, carbon dioxide or binary foam stability in the presence of liquid hydrocarbons and/or demulsifiers (emulsion breakers). It has been found that the use of some of these foamers singularly do not produce a foam of good stability in the presence of liquid hydrocarbon solvents and/or demulsifiers. One embodiment of the foamer component of the present invention is comprised of a water miscible solvent, an alkylbetaine, an alpha-olefin sulfonate and water.

The solvent of the foamer component can be any of the lower molecular weight alcohols having molecular weights of 120 or less, like methanol, ethanol, propanol, isopropanol, isobutanol and the like. Further, the solvent can be any glycol, polyglycol, glycol ether, polyglycol ether, glycol ester, polyglycol ester, glycol ether ester, polyglycol ether ester, or a mixture of any of the above solvents. The preferred solvents of the roamer component are ethanol, methanol and propanol, and preferably are present in an amount of about 5% to about 20% by weight of the total roamer component composition.

The betaines of the roamer component of the present invention are of the general formula $RN^+(CH_3)_2CH_2COO$ where R is a saturated or unsaturated hydrocarbon chain having from 6 to 22 carbon atoms derived from natural or synthetic sources. The betaines are present in an amount of about 10% to about 40% by weight of the total foamer component composition. The preferred betaine is dodecyl betaine (lauryl betaine) or cocobetaine (mixture of saturated and unsaturated betaines having from 8 to 18 carbon atoms) derived from natural coconut oil. Preferably, the cocobetaine is present in an amount of about 10% to about 30% by weight of the total foamer component composition.

The alpha-olefin sulfonate useful in the present invention is derived from an alpha-olefin having from 3 to 40 carbon atoms and preferably, having from 10 to 22 carbon atoms present in amount of about 1% to about 20% by weight of the total foamer component composition. The alpha-olefin sulfonate useful in the practice of the present invention may be ammonium, sodium or potassium alpha-olefin sulfonate and the like. An example of an alpha-olefin sulfonate useful in the practice of the present invention is sodium alpha-olefin sulfonate solution and is available and marketed by Witco Company, Organics Division, under the tradename of Witconate AOS. Several other examples of known alpha-olefin sulfonates available and suitable for use in the practice of the present invention are sold under the tradenames as follows: Bio-Terge, Polystep, and Stepantan marketed by the Stepan Company; Calsoft AOS marketed by the Pilot Chemical Company.

Another embodiment of the foamer component of the present invention is comprised of an ammonium salt of an alkylether sulfate and lauramide diethanolamine (DEA). An example of a salt of an alkylether sulfate suitable for use in the present invention is sold under the tradename of Mazon 41 produced and sold by the PPG/Mazer Inc. of Chicago or produced by the Stepan Company of Chicago under the tradenames of Steol CA-460 and Steol CS-460. Lauramide DEA is also produced by the Stepan Company and is sold under the tradenames of Ninol 30-LL and Ninol 40CO. Preferably, the alkylether sulfate is present in an amount of about 304 to about 404 by weight of the total foamer composition. Preferably, lauramide DEA is present in an amount of about 154 to about 254 by weight of the total foamer component composition.

The energizing phase component of the present invention is comprised of carbon dioxide, nitrogen, or a mixture of carbon dioxide and nitrogen. Preferably, if only carbon dioxide is used as the energizing phase component, a carbon dioxide flow rate to maintain about a 60% to about 90% foam quality is utilized in the practice of the present invention. Preferably, a flow rate sufficient to maintain a 70% foam quality is utilized. Foam quality, as used in the art, refers to the ratio of gaseous phase to sum of gaseous and liquid phases. If nitrogen is used as the energizing phase component, then a flow rate to maintain from about a 60% to about a 90% foam quality is utilized. Preferably, the nitrogen flow rate is such to maintain a 70% quality foam. If a mixture of carbon dioxide and nitrogen is utilized, then preferably a ratio of about 5:2 carbon dioxide to nitrogen is utilized with the total flow rate sufficient to maintain about 70% foam quality.

In the practice of the present invention, various proppant materials can be used. For example, sand, glass beads, sintered bauxite, fine gravel and the like can be used. The proppant is mixed with the gel before or after the foamer is added and prior to the introduction of the energizing phase component. The amount of proppant utilized in the practice of the present invention can be varied to provide the desired amount of proppant for introduction into the formation as is known in the art.

The method of fracturing a subterranean formation utilizing the present invention comprises: (1) mixing diesel oil or other liquid hydrocarbons with a polymer or a mixture of polymers in a batch mixer in a 1:1 ratio to form a slurry; (2) pumping water or brine (or a mixture of water and brine or brine and alcohol) to the well head; (3) while pumping the water or brine to the well head, adding the diesel oil/polymer slurry to the brine or water, thus generating a fracturing gel component; (4) while pumping the fracturing gel component to the well head, adding a foamer component of the present invention to the fracturing gel; (5) after the addition of the foamer component to the gel, adding an energizing phase component of carbon dioxide, nitrogen or carbon dioxide and nitrogen to the mixture of the fracturing gel and the foamer component; (6) after the addition of the energizing phase component, injecting the mixture of the fracturing gel component, the foamer component, and energizing phase component into the well bore and subsequently into the formation; (7) maintaining a sufficient pressure on the well head until fracture of the formation is achieved and subsequently releasing the pressure to recover the mixture injected. If desired, the fracturing gel may be crosslinked with crosslinkers known in the art. Further, and if desired, a proppant material can be added to the mixture of the fracturing gel component with the foamer component before the addition of the energizing phase.

Foam generation equipment, as shown in FIG. 1, was used to test foamers of the present invention at conditions up to 1000 psi and 225° F. to see if the foamers were compatible with fracturing gels containing liquid hydrocarbons or demulsifiers. The equipment consisted of a conduit containing base fluid comprised of the fracturing gel component of polymer slurried in diesel and/or demulsifier mixed with foamer and with a 2% potassium chloride aqueous solution. To the fracturing gel component, there was added a complexer, i.e., crosslinker by the complexer pump if desired. After the addition of the crosslinker, nitrogen and then carbon dioxide was added. The mixture of the fracturing gel component and the energizing phase was run through a heat exchanger where the mixture was heated to the desired temperature. Subsequently, the mixture was directed to a packed bed mixer where the mixture was mixed to form a foam. After the mixer, the foam was directed to one of the two heated view cells through which the mixture was passed until the pressure, temperature and flow rates reached precalculated values and the system was equilibrated. After this, the other heated view cell was loaded with the foam and the view cell was subsequently closed. The view cells are conduits with valves at either end which may be opened and closed. The view cells were constructed to withstand the temperature of at least 250° F. and pressure up to 2500 psi. The view cells were also constructed such that a portion of a side of the view cell conduit is an observation window to allow observation of the stability of the foam contained in the view cell conduit. The foam destabilization was observed and the volume of liquids drained from the foam was recorded. Tests were performed at (1) 160° F. and 700 psi on guar polymer 40 pounds/1000 gallons in 2% potassium chloride (KCl) aqueous solution, pumping rate 40 milliliters per minute (ml/min), the carbon dioxide flow rate was 0.017 lb/min, nitrogen flow rate was 2.96 standard cubic feet per minute (SCF/min), and (2) at 225° F./1000 psi on guar polymer 40 pounds/1000 gallons in 2% KCl aqueous solution, pumping rate was 40 ml/min, carbon dioxide flow rate was 0.018 lb/min, nitrogen flow rate was 3.05 SCF/min. The flow rates were calculated to assure a 70% foam quality, 50% $CO_2$, 20% $N_2$, 30% liquid.

The polymer component used was (1) a dry, diesel oil free product (see Experiment 1 of Table 1 below) or (2) was a 1:1 mixture with diesel oil (see Experiments 2–16 of Table 1 below). As stated, in a typical experiment, all foam components were pumped through one view cell until temperature, pressure, and flow rates reached precalculated values and the system equilibrated. At this point, the other view cell was loaded with foam.

Next, the cell was closed and foam destabilization was observed. The volume of liquids drained from the foam was recorded at five minute intervals. Foam quality and half-life time (T½) were measured. Foam quality was calculated as follows:

ous solution (artificial brine) slurried polymer component with the foamer component of the present invention.

TABLE 1

Half-Life Time of 70% Quality Binary Foams Generated from Different Foamer Compositions

| Experiment # | Gel | Foam Composition (loading concentration vol %) | | T½ 700 psi 160° F. | T½ 1000 psi 225° F. |
|---|---|---|---|---|---|
| 1 | No Diesel | Cocobetaine (0.7%) | Dem (0.1%) | 3:00 hr | 20 min |
| 2 | Diesel Present | Cocobetaine (0.7%) | | 33 min | |
| 3 | Diesel Present | Cocobetaine (0.7%) | Dem (0.1%) | 5 min | 0 |
| 4 | Diesel Present | Cocobetaine (1.0%) | Dem (0.1%) | | 0 |
| 5 | Diesel Present | Cocobetaine (1.5%) | Dem (0.1%) | >2:00 hr | 1:10 hr |
| 6 | Diesel Present | AOS (0.1%) | Dem (0.1%) | 33 min | |
| 7 | Diesel Present | AOS (0.7%) | | 3:10 hr | |
| 8 | Diesel Present | AOS (0.7%) | Dem (0.1%) | 2:20 hr | 30 min |
| 9 | Diesel Present | Mazon 41 (0.7%) | Dem (0.1%) | >3:30 hr | 1:30 hr |
| 10 | Diesel Present | Steol CA-460 (0.56%) Ninol 30-LL (0.14%) | Dem (0.1%) | 3:30 hr | 1:50 hr |
| 11 | Diesel Present | Cocobetaine (0.5%) AOS-12 (0.2%) | Dem (0.1%) | | 1:50 hr |
| 12 | Diesel Present | Cocobetaine (0.5%) AOS (0.2%) | Dem (0.1%) | >3:00 hr | 2:00 hr |
| 13 | Diesel Present | Cocobetaine (0.58%) AOS (0.12%) | Dem (0.1%) | | 2:15 hr |
| 14 | Diesel Present | Cocobetaine (0.3%) AOS (0.1%) | Dem (0.1%) | | 1:05 hr |
| 15 | Diesel Present | Cocobetaine (0.54%) AOS (0.16%) | Dem (0.1%) | | 2:00 hr |
| 16 | Diesel Present | Cocobetaine (0.62%) AOS (0.18%) | Dem (0.1%) | 3:20 hr | 2:20 hr |

AOS = C—14–C—16, alpha-olefin sulfonate (40% sol).
Mazon 41 = alkylphenoxypolythylene sulfate (60% sol).
Ninol 30-LL = lauric diethanolamide (100%).
AOS-12 = C—12, alpha-olefin sulfonate (40% sol).
Steol CA-460 = ammonium laureth sulfate (60% sol).
Dem = Emulsion control additive (demulsifier) (10% sol).

$$\text{Foam Quality} = \frac{\text{(View Cell Volume} - \text{Liquids in Cell After Total Foam Collapse)}}{\text{View Cell Volume}} \times 100\%$$

Foam half-life time was recorded when half of liquid drained to the bottom of a view cell containing the foam.

Various foamers were tested on a binary foam generator under the above conditions (See Table 1 for results). Analysis of the results indicate that diesel oil severely, and demulsifiers to a lesser extent, inhibit the performance of foamers. Results of single foamer experiments (Nos. 1–9) compared to results obtained from a mixture of various foamers (Nos. 10–16) clearly indicate the superiority of the mixtures versus the same foamer components applied singularly and separately. For example, in experiment 5, a 1.5% concentration of cocobetaine had to be applied to achieve the same foam stability (T½1:05 s 1:10 hr/1000 psi 225° F.) as when 0.4% of a mixture (0.3% cocobetaine, 0.1% AOS) was used in experiment no. 14.

The foam generated with the foamers of the present invention exhibits little temperature and pressure dependency, that is, temperature and pressure have small destabilization effects on the foam. Table 1 illustrates that eight foamer component compositions of the present invention are not diesel oil or demulsifier sensitive and are compatible therewith, i.e., they have a half-life of at least one hour at 1000 psi and 225° F. in the presence of diesel oil and/or demulsifiers. The tests in Table 1 illustrate that very stable foams were generated using a 50% diesel and 50% guar in 2potassium chloride aqueous solution (artificial brine) slurried polymer component with the foamer component of the present invention.

What is claimed is:

1. A fracturing gel comprised of polymer, diesel oil and a foamer, said foamer comprised of (a) from about 5% to 20% by weight solvent, said solvent comprised of an alcohol having a molecular weight of 120 or less, a glycol, or mixtures thereof; (b) from about 10% to about 30% by weight betaine; and (c) from about 1% to about 20% by weight alpha-olefin sulfonate.

2. The fracturing gel of claim 1 wherein the polymer is crosslinked.

3. The fracturing gel of claim 1 wherein the betaine Of the foamer is selected from the group comprised of betaines having from 6 to 22 carbon atoms.

4. The fracturing gel of claim 1 wherein the alpha-olefin sulfonate of the foamer is sodium or ammonium alpha-olefin sulfonate.

5. The fracturing gel of claim 1 wherein the alpha-olefin sulfonate of the foamer is potassium alpha-olefin sulfonate.

6. The fracturing gel of claim 1 wherein the alpha-olefin sulfonate of the foamer has from about 10 to about 22 carbons atoms.

7. The fracturing gel of claim 1 wherein the diesel oil and polymer are present in equal amounts by weight percent.

8. The fracturing gel of claim 1 additionally including brine or brine and alcohol.

9. A fracturing foam composition comprised of:
   from about 0.2% to about 3% by volume slurry polymer component comprised of from about 30% to 50% by volume liquid hydrocarbon and from 50% to 70% volume polymer;

from about 10% to 40% by volume water, brine or a mixture of brine and alcohol;

from 0.1% to about 2% by volume foamer component comprised of a betaine, an olefin sulfonate, and a solvent; and from about 50% to 90% by volume energizing phase component comprised of nitrogen, carbon dioxide or nitrogen and carbon dioxide.

10. The fracturing foam composition of claim 9 wherein the polymer is comprised of galactomannan gum, glucomannan gum, or cellulose and mixtures thereof.

11. The fracturing foam composition of claim 9 wherein the foamer component is comprised of a betaine, a hydrophilic solvent comprised of an alcohol, a glycol, or mixtures thereof, and an alpha-olefin sulfonate.

12. The fracturing foam composition of claim 11 wherein the alpha-olefin sulfonate of the foamer component is an alkali metal or ammonium alpha-olefin sulfonate derived from an alpha-olefin having from about 10 to about 22 carbon atoms.

13. The fracturing foam composition of claim 9 wherein the foamer component is comprised of from about 10% to about 30% betaine by weight; from about 5% to about 20% solvent by weight; and from about 1% to about 20% alpha-olefin sulfonate by weight.

14. The fracturing foam composition of claim 9 wherein the mixture of brine and alcohol is comprised of from about 1% to about 20% methanol.

15. A foam comprising a polymer, diesel oil, carbon dioxide or nitrogen or carbon dioxide and nitrogen, and a foamed, said foamer comprising about 12% by weight of the foamer methanol, about 23% by weight of the foamer cocobetaine, about 8% by weight of the roamer sodium alpha-olefin sulfonate, and water.

16. The foam of claim 15 wherein the foamer comprises from about 0.1% by volume to about 3% by volume of the foam.

17. A foam comprised of diesel oil, polymer, and a foamer, said foam being 70% quality with a half-life of at least one hour at 1,000 psi and 225° F., said foamer comprised of ammonium salt of an alkylether sulfate and lauramide diethanolamine.

18. The foam of claim 17 wherein the roamer is comprised of about 30% to about 40% by weight ammonium salt of alkylether sulfate and about 15% to 25% by weight lauramide diethanolamine.

19. A foam used for fracturing subterranean formations comprised of:

(a) a fracturing gel component comprised of a polymer, diesel oil, water or brine, (b) a foamer component comprised of solvent, betaine, and an olefin sulfonate, and (c) an energizing phase component comprised of carbon dioxide or nitrogen or carbon dioxide and nitrogen.

20. The foam of claim 19 wherein the polymer of the fracturing gel component is comprised of guar or cellulose.

21. The foam of claim 19 wherein the alpha-olefin sulfonate of the second foamer component is an alkali or ammonium alpha-olefin sulfonate derived from an alpha-olefin having from about 10 to about 22 carbon atoms.

22. The foam of claim 19 wherein the polymer and diesel oil of the first fracturing gel component are present in equal amounts by weight percent.

23. The foamer component of claim 19 wherein the solvent is methanol.

24. The foam of claim 19 wherein the fracturing gel component is comprised of about 20% alcohol or less.

25. The foam of claim 19 wherein the polymer of the fracturing gel component is crosslinked.

26. A foamer comprised of a mixture of an alkylether sulfate and lauramide diethanolamine or a mixture of a betaine and an alpha-olefin sulfonate for fracturing gels containing diesel oil and demulsifiers, said foamer and gels producing a 70% quality foam having a half-life of at least one hour at 1,000 psi and 250° F.

27. The foamer of claim 26 wherein the foamer is additionally comprised of a solvent comprised of an alcohol having a molecular weight of 120 or less or a glycol, or mixtures thereof.

28. The foamer of claim 27 wherein the foamer is comprised from about 10% to about 30% by weight betaine, about 5% to about 20% by weight solvent, and about 1% to about 20% alpha-olefin sulfonate.

29. The foamer of claim 27 wherein the solvent of the foamer is comprised of an alcohol having a molecular weight of the 120 or less.

30. The foamer of claim 27 wherein the alpha-olefin sulfonate is an alkali metal or ammonium alpha-olefin sulfonate having from about 10 to about 22 carbon atoms.

31. A fracturing foam comprising a polymer, diesel oil, carbon dioxide or nitrogen or a mixture thereof, and a foamer, said foamer comprised of: a hydrophilic solvent comprised of an alcohol, a glycol, or mixtures thereof; a betaine; and an alpha-olefin sulfonate.

32. A fracturing foam comprising a polymer, diesel oil, carbon dioxide or nitrogen or a mixture thereof, and a foamer comprised of an ammonium salt of an alkylether sulfate and lauramide diethanolamine.

33. The fracturing foam composition of claim 32 wherein the foamer is comprised of an ammonium salt of an alkylether sulfate and lauramide diethanolamine.

34. The fracturing foam of claim 33 wherein the former is comprised of about 30% to about 40% by weight ammonium salt of alkylether sulfate and from about 15% to about 25% by weight lauramide diethanolamine.

* * * * *